(12) United States Patent
Shi et al.

(10) Patent No.: US 10,521,018 B2
(45) Date of Patent: Dec. 31, 2019

(54) HUMAN BODY-BASED INTERACTION METHOD AND INTERACTION APPARATUS

(71) Applicant: Beijing Zhigu Rui Tuo Tech Co., Ltd, Beijing (CN)

(72) Inventors: Yuanchun Shi, Beijing (CN); Yuntao Wang, Beijing (CN); Lin Du, Beijing (CN)

(73) Assignee: Beijing Zhigu Rui Tuo Tech Co., Ltd, Beijing (CN)

( * ) Notice: Subject to any disclaimer, the term of this patent is extended or adjusted under 35 U.S.C. 154(b) by 259 days.

(21) Appl. No.: 15/316,135

(22) PCT Filed: Dec. 29, 2014

(86) PCT No.: PCT/CN2014/095286
§ 371 (c)(1),
(2) Date: Dec. 2, 2016

(87) PCT Pub. No.: WO2015/184778
PCT Pub. Date: Dec. 10, 2015

(65) Prior Publication Data
US 2017/0147079 A1    May 25, 2017

(30) Foreign Application Priority Data

Jun. 4, 2014 (CN) .......................... 2014 1 0243743

(51) Int. Cl.
*G06F 3/01* (2006.01)
*G06K 9/00* (2006.01)

(52) U.S. Cl.
CPC .............. *G06F 3/017* (2013.01); *G06F 3/011* (2013.01); *G06K 9/00342* (2013.01)

(58) Field of Classification Search
CPC ...... G06F 3/011; G06F 3/017; G06K 9/00342
See application file for complete search history.

(56) References Cited

U.S. PATENT DOCUMENTS

| 7,480,492 B2 | 1/2009 | Williams et al. |
| 8,274,386 B1 | 9/2012 | Dea et al. |

(Continued)

FOREIGN PATENT DOCUMENTS

| CN | 101741952 A | 6/2010 |
| CN | 102426651 A | 4/2012 |

(Continued)

OTHER PUBLICATIONS

International Search Report for PCT Application No. PCT/CN2014/095286, dated Apr. 3, 2015, 4 pages.

(Continued)

*Primary Examiner* — Nelson M Rosario
(74) *Attorney, Agent, or Firm* — Amin, Turocy & Watson, LLP

(57) ABSTRACT

Embodiments of the present application disclose a human body-based interaction method and interaction apparatus. The method includes: acquiring phase change information of a second signal; the second signal being formed by a first signal through transmission of at least one transmission medium, the at least one transmission medium including the body of a user; and according to a first corresponding relationship between at least one phase change information and at least one motion and/or posture information of the user, determining motion and/or posture information of the user corresponding to the phase change information. At least one example embodiment of the present application determines motion and/or posture information of a user merely by using phase change information of a signal transmitted through the user's body, so that determination of the motion and/or posture information of the user is more convenient and accurate.

36 Claims, 8 Drawing Sheets

(56) References Cited

U.S. PATENT DOCUMENTS

| | | |
|---|---|---|
| 8,665,210 B2 | 3/2014 | Tan et al. |
| 2008/0046425 A1 | 2/2008 | Perski |
| 2008/0275328 A1 | 11/2008 | Jones |
| 2009/0012921 A1* | 1/2009 | Bonnet .............. G06K 9/00342 706/12 |
| 2010/0030088 A1* | 2/2010 | Carney .............. A61B 5/02427 600/500 |
| 2010/0145171 A1 | 6/2010 | Park et al. |
| 2010/0219989 A1 | 9/2010 | Asami et al. |
| 2011/0181510 A1 | 7/2011 | Hakala et al. |
| 2012/0162057 A1 | 6/2012 | Tan et al. |
| 2012/0220233 A1 | 8/2012 | Harrison et al. |

FOREIGN PATENT DOCUMENTS

| | | |
|---|---|---|
| CN | 102854978 A | 1/2013 |
| CN | 103392332 A | 11/2013 |
| CN | 103605423 A | 2/2014 |
| CN | 103760970 A | 4/2014 |
| CN | 104049752 A | 9/2014 |

OTHER PUBLICATIONS

Miika Valtonen, Henrik Raula, and Jukka Vanhala. "Human body tracking with electric field ranging". In Proceedings of the 14th International Academic MindTrek Conference: Envisioning Future Media Environments (MindTrek '2010). ACM, New York, NY, USA, 183-186. Retrieved Dec. 1, 2016, 4 pages.

Bae, J., Cho, H., Song, K, Lee, H., and Yoo, H. J. "The signal transmission mechanism on the surface of human body for body channel communication", IEEE Transactions on Microwave Theory and Techniques, 60(3), Mar. 2012, 582-593. Retrieved Dec. 1, 2016, 12 pages.

* cited by examiner

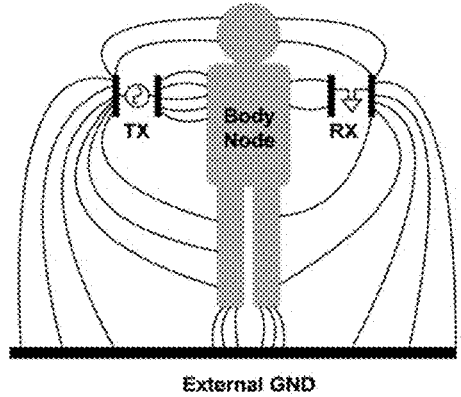 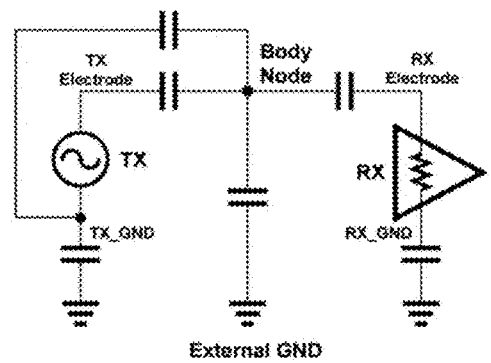
FIG. 1a  FIG. 1b
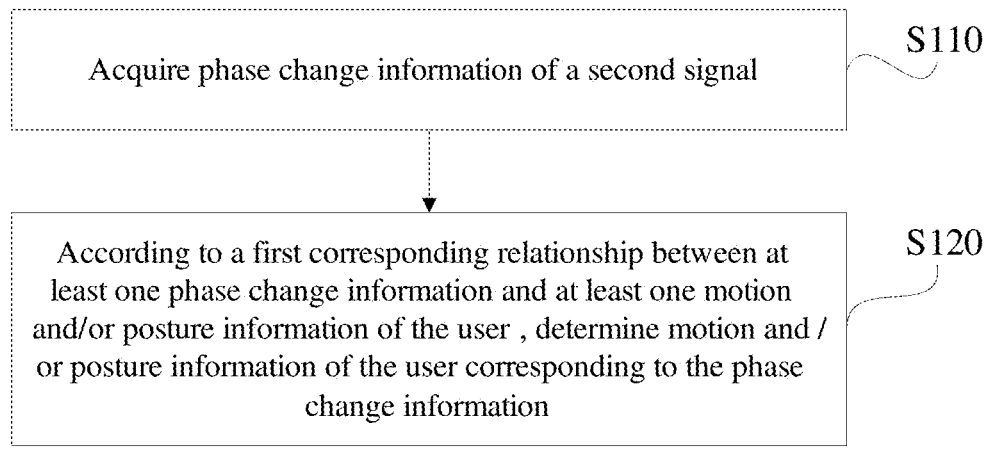
FIG. 2

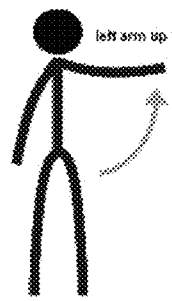
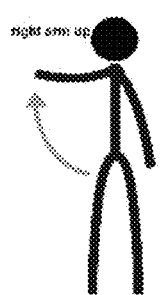
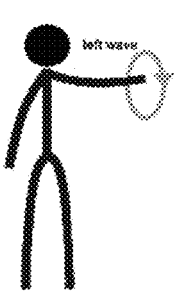
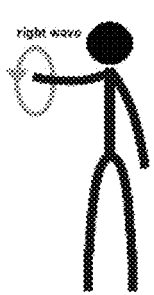
FIG. 3a　　　FIG. 3b　　　FIG. 3c　　　FIG. 3d
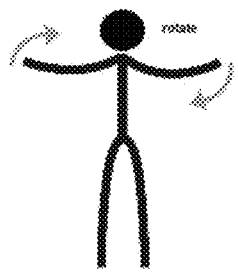
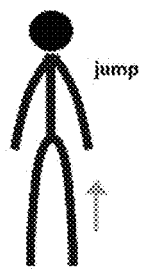
FIG. 3e　　　　　FIG. 3f　　　　　FIG. 3g
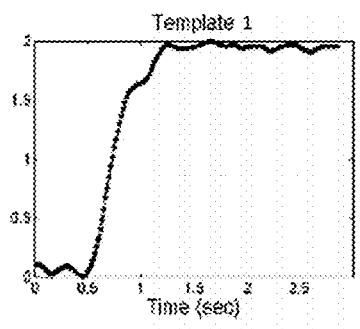
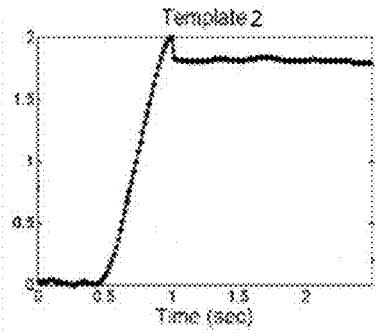
FIG. 4a　　　　　　FIG. 4b
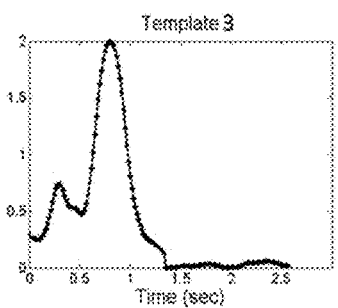
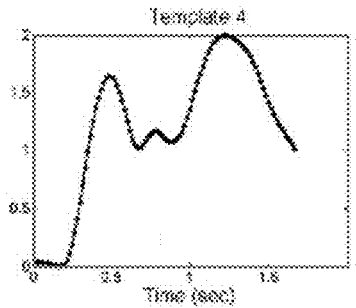
FIG. 4c　　　　　　FIG. 4d

HUMAN BODY-BASED INTERACTION METHOD AND INTERACTION APPARATUS

RELATED APPLICATION

The present application is a U.S. National Stage filing under 35 U.S.C. § 371 of international patent cooperation treaty (PCT) application No. PCT/CN2014/095286, filed Dec. 29, 2014, and entitled "HUMAN BODY-BASED INTERACTION METHOD AND INTERACTION APPARATUS", which claims the benefit of priority to Chinese Patent Application No. 201410243743.1, filed on Jun. 4, 2014, which applications are hereby incorporated into the present application by reference herein in their respective entireties.

TECHNICAL FIELD

The present application relates to interaction technologies, and in particular, to a human body-based interaction method and interaction apparatus.

BACKGROUND

With increasingly powerful functions of mobile electronic devices and popularity of wearable devices, people want to interact with these devices more conveniently. Interaction provided by these devices has developed from traditional interaction only through keys and touch screens to interaction through a virtual keyboard, voice recognition, fixation point recognition, gesture recognition and other means.

SUMMARY

An example object of the present application is to provide a human body-based interaction scheme.

In a first example aspect, the present application provides a human body-based interaction method, including:

acquiring phase change information of a second signal; the second signal being formed by a first signal through transmission of at least one transmission medium, and the at least one transmission medium including the body of a user; and determining, according to a first corresponding relationship between at least one phase change information and at least one motion and/or posture information of the user, motion and/or posture information of the user corresponding to the phase change information.

In a second example aspect, the present application provides a human body-based interaction apparatus, including:

a first acquisition module, configured to acquire phase change information of a second signal; the second signal being formed by a first signal through transmission of at least one transmission medium, and the at least one transmission medium including the body of a user; and a first determination module, configured to determine, according to a first corresponding relationship between at least one phase change information and at least one motion and/or posture information of the user, motion and/or posture information of the user corresponding to the phase change information.

In a third example aspect, the present application further provides a wearable device, including the human body-based interaction apparatus described above.

At least one embodiment of the present application determines motion and/or posture information of a user merely by using phase change information of a signal transmitted through the user's body, so that determination of the motion and/or posture information of the user is more convenient and accurate. In addition, in at least one another example embodiment of the present application, in addition to determining the motion and/or posture information merely by using the phase change information, touch action information of the user is also determined by merely using amplitude change information of the signal, which may identify touch input of the user more accurately, and may also provide the user with more flexible applications by combining different touch actions with different user motions and/or postures.

BRIEF DESCRIPTION OF THE DRAWINGS

FIG. 1a and FIG. 1b are respectively a schematic diagram of a human body transmission channel and a schematic equivalent circuit diagram thereof according to an embodiment of the present application;

FIG. 2 is a flowchart of an interaction method according to an embodiment of the present application;

FIG. 3a to FIG. 3g are schematic diagrams of a plurality of motion postures of a user according to an embodiment of the present application;

FIG. 4a to FIG. 4g are respectively schematic diagrams of templates of phase change information corresponding to the plurality of motion postures of the user shown in FIG. 3a to FIG. 3g;

DETAILED DESCRIPTION

Figures 4E, 4F:
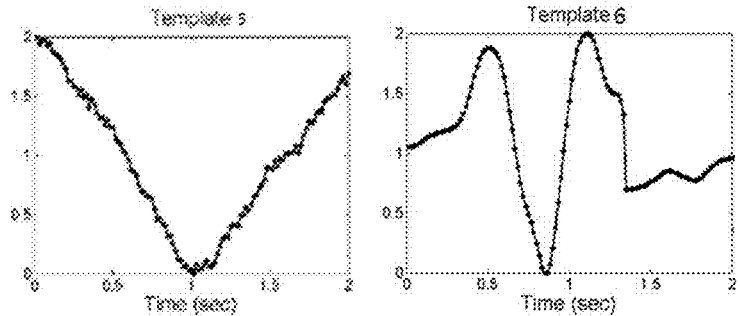
Figure 4G:
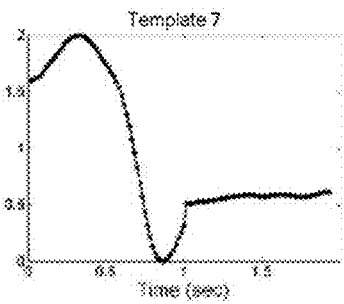

Embodiments of the present application are described in detail hereinafter with reference to the accompanying drawings (the same reference numerals in several drawings indicate the same elements) and embodiments. The following embodiments are intended to describe the present application, but not to limit the scope of the present application.

Those skilled in the art should understand that, the terms such as "first" and "second" in the present application are merely used to distinguish different steps, devices or modules, which neither represent any specific technical meaning nor represent a necessary logical order between them.

The inventor of the present application has found upon research that, the human body will render characteristics of distribution parameters when serving as an electric signal transmission channel, that is, some signals may be transmitted through the human body, and others may be propagated through the air, so as to form a composite transmission channel having resistance and capacitance characteristics. FIG. 1a is a schematic diagram of a human body transmission channel, and FIG. 1b is an equivalent circuit diagram of the human body transmission channel. When a user changes a posture, the capacitance characteristics of the human body transmission channel may change significantly, which directly affects phase information of a received signal, in this case, the resistance characteristics are almost unchanged, and therefore, by detecting and learning phase change information of a signal, motion and/or posture information of the user can be detected separately, so as to determine an instruction input of the user. Therefore, as shown in FIG. 2, an embodiment of the present application provides a human body-based interaction method, including:

S110: acquiring phase change information of a second signal; the second signal being formed by a first signal through transmission of at least one transmission medium, the at least one transmission medium including the body of a user; and S120: according to a first corresponding relationship between at least one phase change information and at least one motion and/or posture information of the user, determining motion and/or posture information of the user corresponding to the phase change information.

For example, the interaction apparatus provided in the present application, serving as an execution body of this embodiment, executes S110-S120. Specifically, the interaction apparatus may be configured in a user equipment as software, hardware or a combination of software and hardware, or, the interaction apparatus is the use equipment; the user equipment includes, but is not limited to, a wearable device such as a smart wristband, a smart ring and a smart belt, and a portable device such as a smart phone or a tablet PC, or the like.

The embodiment of the present application determines motion and/or posture information of a user merely by using phase change information of a second signal acquired after being transmitted through the user's body, so that determination of the motion and/or posture information of the user is more convenient and accurate, which provides a basis for interaction based on motion and/or posture information of the user.

The steps of the embodiment of the present application are further described through the following embodiment.

S110: Acquire phase change information of a second signal.

In the embodiment of the present application, the first signal is an electric signal, for example, an AC signal with the frequency of 10 MHz and the voltage amplitude of 10 volts.

In the embodiment of the present application, the second signal is formed by the first signal through transmission of the at least one transmission medium. In the embodiment of the present application, the at least one transmission medium, in addition to the body of the user, may also include an environmental medium (such as air) in the vicinity of the body of the user, and may even include clothing of the user. In the embodiment of the present application, AC signals presenting near field characteristics during human body transmission are mainly used.

In the embodiment of the present application, the first signal is generated on the body of the user. For example, by attaching a transmission electrode of a transmitting module to the body of the user, the transmitting module directly transmits the first signal onto the body of the user through the transmission electrode. In an example embodiment, the first signal is generated in a first position of the body of the user, and reaches a second position from the first position through the body of the user and the air in the vicinity of the body of the user, so as to form the second signal. That is, a part of the first signal generated in the first position is transmitted to the second position through the body of the user, and the other part reaches the second position through transmission of the air.

In an example embodiment of the embodiment of the present application, the interaction apparatus may include the transmitting module, and configured to transmit the first signal in the first position to generate the first signal.

In another example embodiment, the first signal is transmitted in the first position through a transmitting module of another device outside the interaction apparatus, and the second signal is formed in the second position.

In the embodiment of the present application, the first signal is generated on the body of the user; therefore, compared with use of electromagnetic noise in an environment as a transmission signal, the first signal and the second signal in the embodiment of the present application are less affected by the environment, and the second signal that can accurately determine motion and/or posture information of the user can be acquired in any environment.

In the embodiment of the present application, many manners may be used to acquire the phase change information in step S110. In an example embodiment, the acquiring the phase change information includes:

acquiring at least one signal characteristic of the first signal and the second signal; and processing the at least one signal characteristic and the second signal to obtain the phase change information.

In the embodiment of the present application, the at least one signal characteristic includes: a timing code; or a fingerprint, an average value and/or a differential value of a frequency; or a fingerprint, an average value and/or a differential value of a frequency spectrum; or a fingerprint, an average value and/or a differential value of amplitude; or a fingerprint, an average value and/or a differential value of a phase.

In the embodiment of the present application, the processing includes:

recovering the first signal according to the at least one signal characteristic of the first signal, so as to obtain a recovered signal identical or similar to the first signal; and processing the recovered signal together with the second signal, for example, processing them through a phase-locked loop technology such as Costas loop, so as to obtain the phase change information.

Certainly, in an example embodiment, the method of the present application directly acquires the first signal (in this implementation, it can be considered that all signal characteristics of the first signal are acquired) without recovering the signal, and the phase change information can be obtained by directly processing the first signal and the second signal.

In the embodiment of the present application, many manners may be used to acquire the second signal, for example:

In an example embodiment, the interaction apparatus, serving as the execution body of the method in the embodiment of the present application, includes a signal collection module, and the method of the present application acquires the second signal through collection. For example, the second signal is collected in the second position of the body of the user.

In another example embodiment, the second signal is acquired through external receiving. That is, after a signal collection module of an external device collects the second signal, the interaction apparatus, serving as the execution body of the embodiment of the present application, receives the second signal from the external device through acquisition of a communication module.

In another example embodiment, the acquiring the phase change information includes:

acquiring the second signal within a set period of time;

determining at least one signal characteristic of the second signal corresponding to a first time within the set period of time and at least one signal characteristic of the second signal corresponding to a second time within the set period of time; and processing the at least one signal characteristic of the second signal corresponding to the first time and the at least one signal characteristic of the second signal corresponding to the second time, to obtain the phase change information.

Different from obtaining phase change information of a second signal with respect to a first signal according to signal characteristics of the first signal and the second signal in a certain time, this implementation does not need to acquire the signal characteristics of the first signal, and in this implementation, the phase change information of the second signal in different time periods is acquired through before-and-after comparison of the second signal in a period of time.

In this implementation, suppose that at least one signal characteristic of the second signal in a certain time needs to be determined according to the second signal within N cycles (N is a natural number) prior to this time; therefore, in order to determine the at least one signal characteristic of the second signal corresponding to the first time and the at least one signal characteristic of the second signal corresponding to the second time, the set period of time at least includes 2N cycles. For example, at least one signal characteristic of the second signal corresponding to the first time is obtained according to the second signal in M+1 to M+N cycles (M is a natural number); and then at least one signal characteristic of the second signal corresponding to the second time is obtained according to the second signal in M+N+1 to M+2N cycles.

S120 According to a first corresponding relationship between at least one phase change information and at least one motion and/or posture information of the user, determine motion and/or posture information of the user corresponding to the phase change information.

In the embodiment of the present application, the motion and/or posture does not include motions or postures that the user touches his/her own body directly or indirectly through a conductor. Moreover, the motion and/or posture herein is preferably a motion and/or posture that may bring about significant changes to the capacitance characteristics of the body transmission channel of the user, for example, arm up, jump, rotate and other actions described hereinafter; however, gesture changes and the like of the user, due to small changes to the capacitance characteristics, are not preferably used as the motion and posture determined in the embodiment of the present application. As described below in the present application, a touch input is determined through amplitude changes of the second signal.

In an example embodiment of the embodiment of the present application, the first corresponding relationship, for example, may be:

a first relationship mapping table between the at least one phase change information and the at least one motion and/or posture information. By mans of the first relationship mapping table, the motion and/or posture information corresponding to the phase change information can be found.

In another example embodiment of the embodiment of the present application, the first corresponding relationship, for example, may also be a first classifier, and by means of a classification algorithm corresponding to the first classifier, the motion and/or posture information corresponding to the phase change information can be acquired.

In the embodiment of the present application, the method further includes:

acquiring the first corresponding relationship.

For example, the first corresponding relationship is acquired through machine learning.

By taking that the first corresponding relationship is the first classifier as an example, in the present application, when the first corresponding relationship is acquired through machine learning, it is generally necessary to train the first classifier according to multiple pieces of phase change information corresponding to multiple pieces of motion and/or posture information of a known user.

When the user changes a body posture, such as, walk, stand up, sit down, or wave hand(s), the corresponding posture and/or action can be recognized through the first classifier pre-trained according to phase change information of the second signal. For example, as shown in FIG. 3a to FIG. 3g and FIG. 4a to FIG. 4g, when phase change information PC of the second signal changing with Time respectively corresponds to Templates 1-7 shown in FIG. 4a to FIG. 4g, it respectively corresponds to the following actions and postures of the user, that is, left arm up (FIG. 3a), right arm up (FIG. 3b), left wave (FIG. 3c), right wave (FIG. 3d), rotate (FIG. 3e), jump (FIG. 3f), and prepare to on-body touch (FIG. 3g, here, the on-body touch means the user touches his/her own body).

In an example embodiment of the embodiment of the present application, the determined motion and/or posture information may be provided to external software or hardware, so as to implement functions corresponding to the motion and/or posture of the user.

In another example embodiment of the embodiment of the present application, the method further includes:

according to a second corresponding relationship between at least one motion and/or posture information and at least one first instruction, determining a first instruction corresponding to the motion and/or posture information.

In the embodiment of the present application, the second corresponding relationship, for example, may be a second relationship mapping table between the at least one motion and/or posture information and the at least one first instruction.

In an example embodiment, the second corresponding relationship may be acquired through user setting. In another example embodiment, the second corresponding relationship may also be acquired through machine learning according to previous habits of the user.

Herein, the first instruction, for example, may be an operation instruction for a user equipment.

Figure 5:
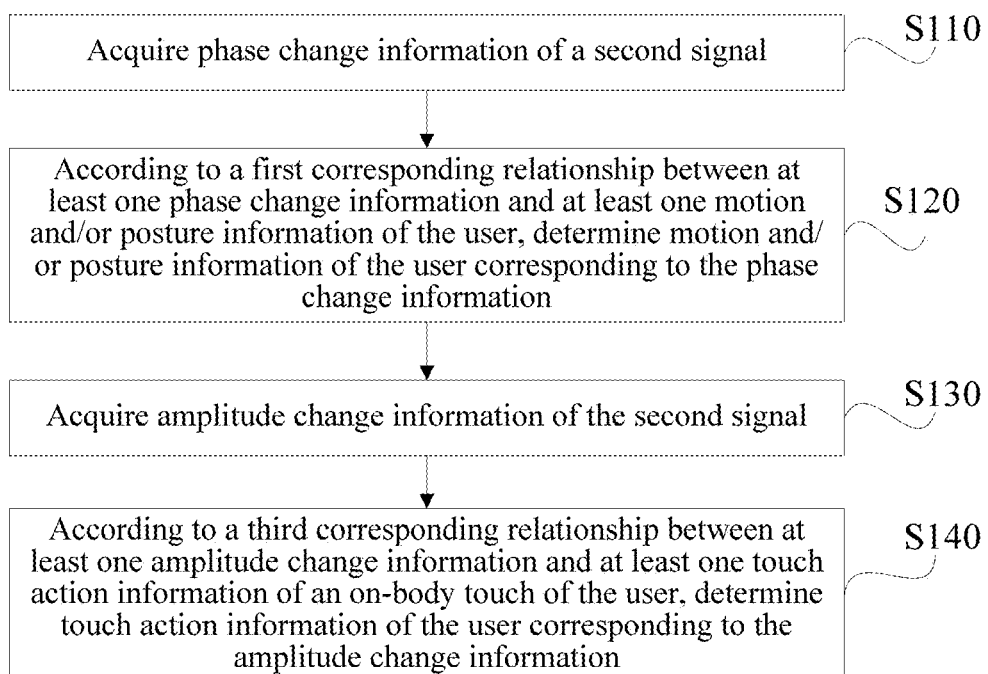
FIG. 5 is a flowchart of another interaction method according to an embodiment of the present application.

In addition to determining motion and/or posture information of the user through phase changes of a signal described above, the inventor of the present application has further found upon research that, when the user executes an on-body touch input instruction, the resistance characteristics will change significantly due to construction of a new human body channel, which directly affects amplitude information of a received signal, and in this case, the capacitance characteristics are almost unchanged. In this way, by detecting and learning amplitude information of a signal, the on-body touch input instruction of the user can be detected separately. Therefore, as shown in FIG. 5, in the embodiment of the present application, the method further includes:

S130: acquiring amplitude change information of the second signal; and

S140: according to a third corresponding relationship between at least one amplitude change information and at least one touch action information of an on-body touch of the user, determining touch action information of the user corresponding to the amplitude change information.

In the embodiment of the present application, similar to acquisition of the first corresponding information described above, the third corresponding relationship may be in a form of a third relationship mapping table, or may be in a form of a second classifier. In the embodiment of the present application, the third corresponding relationship may also be acquired through machine learning.

In the embodiment of the present application, the on-body touch of the user means: a part of the body of the user touches another part of the body of the user, for example, the left hand of the user touches the right hand; or a part of the user indirectly touches another part of the body of the user through at least one conductor. That is, the on-body touch of the user refers to a touch that may change the electronic properties.

Figure 6:
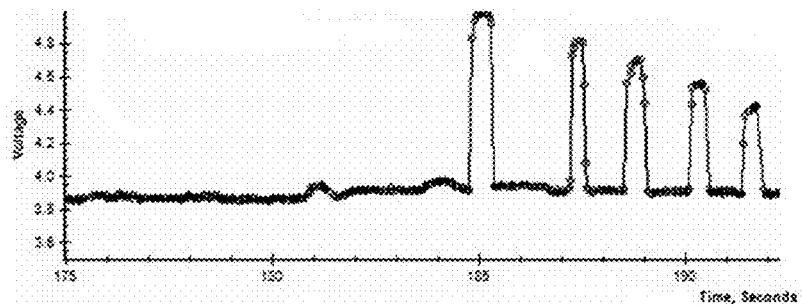
FIG. 6 is a schematic diagram of a voltage of a second signal changing with time when a user touches his/her own body according to an embodiment of the present application.

In this implementation, when the on-body touch of the user is performed to input an instruction, for example, when the right hand of the user clicks on, slides on, or grips the left forearm, amplitude change information of the second signal is detected, and the corresponding posture and/or action is recognized through the pre-trained second classifier. For example, FIG. 6 is a diagram of a curve showing that Voltage of the second signal changes with Time. Within a time interval of 175-184 seconds, a user under test performs an on-body touch, and five rising peaks after 184 seconds are respectively voltage changes formed by the user using the right hand palm to grip the left arm, the left wrist, the upper portion of the left hard, the middle portion of the left hand, and the fingertip of the left hand. It can be seen from FIG. 6 that, amplitude of the second signal responds quickly to the action that the on-body touch of the user, and has a higher degree of discrimination for different touch positions. In addition, in addition to gripping the left hand by the right hand shown in FIG. 6, the inventor of the present application has further found that, if a finger of the right hand is used to respectively click on corresponding positions of the left arm, the left wrist, the upper portion of the left hard, the middle portion of the left hand, and the fingertip of the left hand, five rising peaks may also be obtained, and compared with the touch of gripping with the hand palm, amplitude changes of the second signal brought about by the clicking touch are much smaller. Therefore, in addition to the discrimination of different touch positions described above, different touch manners may also be distinguished from each other through the amplitude changes.

In the embodiment of the present application, the acquiring the amplitude change information includes:

acquiring the second signal within a set period of time;

determining amplitude information of the second signal corresponding to a first time within the set period of time and amplitude information of the second signal corresponding to a second time within the set period of time; and comparing the amplitude information of the second signal corresponding to the first time and the amplitude information of the second signal corresponding to the second time, to obtain the amplitude change information.

In the embodiment of the present application, the phase change information and the amplitude change information can be acquired simultaneously through the second signal within the set period of time.

In an example embodiment of the embodiment of the present application, the determined touch action information may be provided externally. In another example embodiment, the method further includes:

according to a fourth corresponding relationship between at least one touch action information and at least one second instruction, determining a second instruction corresponding to the touch action information.

In this implementation, the body motion posture and on-body touch input instruction of the user are detected simultaneously on two dimensions of a signal, that is, amplitude and phase, touch input can be recognized more accurately, and two input manners may also be combined to provide the user with more flexible applications. For example, when the user sits on the couch to watch TV, the on-body touch input instruction may be automatically matched to the TV; when the user walks outdoors, the on-body touch input instruction may be automatically matched to a smart watch; and when the user lies in bed, the on-body touch input instruction may be automatically matched to a lighting control system.

Those skilled in the art should understand that, in the method of the specific implementation of the present application, sequence numbers of the steps do not mean an order of execution, the order of execution of the steps should be determined according to functions and internal logic thereof, but should not pose any limitation to this implementation process of the specific implementation of the present application.

Figure 7:
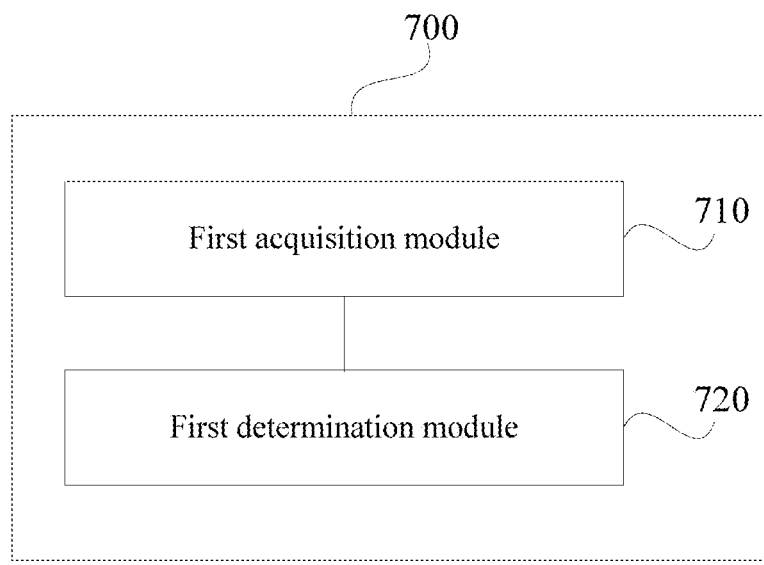
FIG. 7 is a schematic structural diagram of an interaction apparatus according to an embodiment of the present application.

As shown in FIG. 7, the present application provides a human body-based interaction apparatus 700, including:

a first acquisition module 710, configured to acquire phase change information of a second signal; the second signal being formed by a first signal through transmission of at least one transmission medium, the at least one transmission medium including the body of a user; and a first determination module 720, configured to: according to a first corresponding relationship between at least one phase change information and at least one motion and/or posture information of the user, determine motion and/or posture information of the user corresponding to the phase change information.

The embodiment of the present application determines motion and/or posture information of a user merely by using phase change information of a second signal acquired after being transmitted through the user's body, so that determination of the motion and/or posture information of the user is more convenient and accurate, which provides a basis for interaction based on motion and/or posture information of the user.

The modules in the embodiment of the present application are further described through the following embodiment.

In the embodiment of the present application, the first signal is an electric signal.

In the embodiment of the present application, the first signal is generated on the body of the user. Reference can be made to corresponding description in the forgoing process embodiment for details.

Figure 8A:
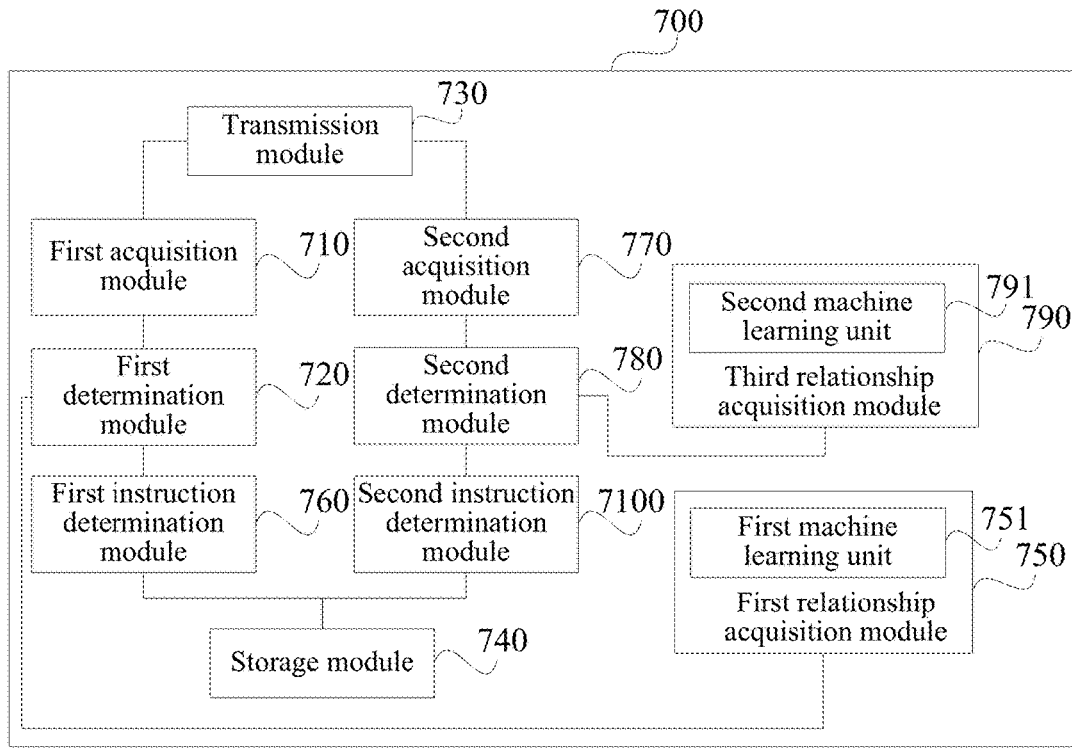
FIG. 8a is a schematic structural diagram of another interaction apparatus according to an embodiment of the present application.

For example, as shown in FIG. 8a, in an example embodiment, the apparatus 700 further includes: a transmitting module 730, configured to transmit the first signal in a first position of the body of the user. Certainly, those skilled in the art can know that, the apparatus may not include the transmitting module, but uses a transmitting module of another device to generate the first signal.

In the embodiment of the present application, the at least one transmission medium, in addition to the body of the user, may also include an environmental medium (such as air) in the vicinity of the body of the user, and may even include clothing of the user.

In the embodiment of the present application, the first signal is generated on the body of the user; therefore, compared with use of electromagnetic noise in an environment as a transmission signal, the first signal and the second signal in the embodiment of the present application are less affected by the environment, and the second signal that can accurately determine motion and/or posture information of the user can be acquired in any environment.

In the embodiment of the present application, the first acquisition module 710 acquires the phase change information in many manners.

Figure 8B:
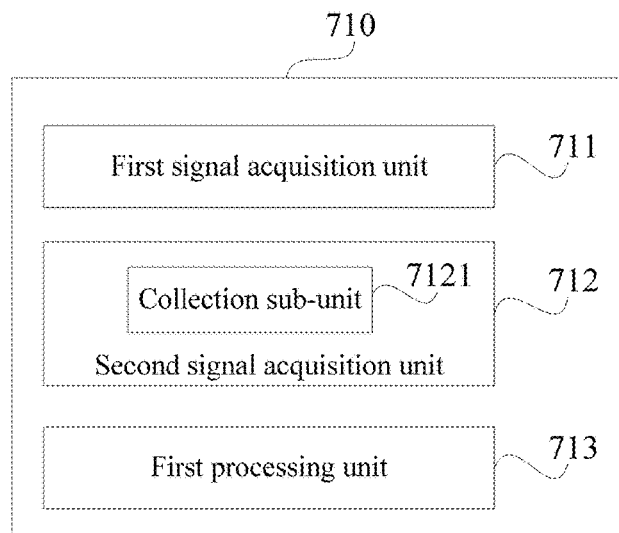
FIG. 8b to FIG. 8d are three schematic structural diagrams of a first acquisition module of an interaction apparatus according to an embodiment of the present application.

As shown in FIG. 8b, in an example embodiment, the first acquisition module 710 includes:

a first signal acquisition unit 711, configured to acquire at least one signal characteristic of the first signal;

a second signal acquisition unit 712, configured to acquire the second signal; and a first processing unit 713, configured to process the at least one signal characteristic and the second signal to obtain the phase change information.

In the embodiment of the present application, the at least one signal characteristic includes: a timing code; or a fingerprint, an average value and/or a differential value of a frequency; or a fingerprint, an average value and/or a differential value of a frequency spectrum; or a fingerprint, an average value and/or a differential value of amplitude; or a fingerprint, an average value and/or a differential value of a phase.

In an example embodiment, the first signal acquisition unit 711, for example, may be a communication unit, configured to receive at least one signal characteristic of the first signal. In another example embodiment, for example, at least one signal characteristic of the first signal, for example, may be stored in a storage module 740 of the apparatus 700, and the first signal acquisition unit 711 acquires a corresponding signal characteristic from the storage module 740 through reading. Certainly, the first, second, third and fourth corresponding relationships mentioned above and to be mentioned hereinafter may also be stored in the storage module 740.

As shown in FIG. 8b, in one example embodiment, the second signal acquisition unit 712 includes:

a collection sub-unit 7121, configured to collect the second signal. For example, the collection sub-unit is configured to collect the second signal in a second position of the body of the user.

Figure 8C:
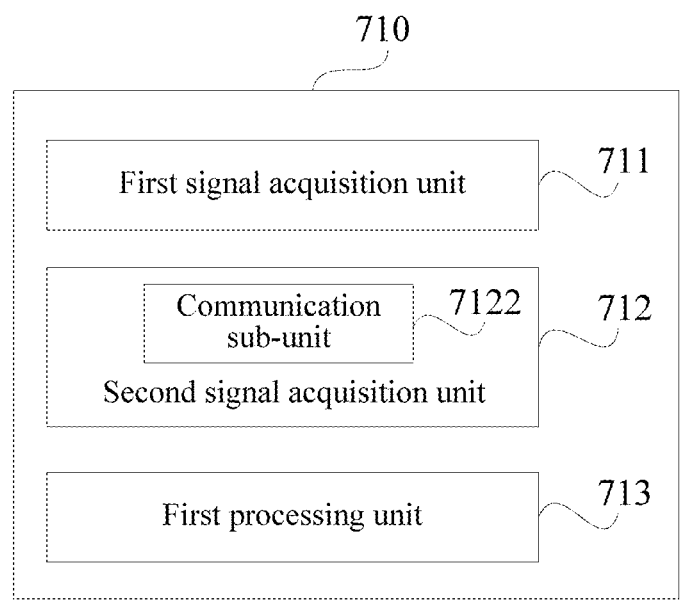

As shown in FIG. 8c, in another example embodiment, the second signal acquisition unit 712 includes:

a communication sub-unit 7122, configured to receive the second signal externally.

In the embodiment of the present application, the first processing unit 713 is further configured to:

recover the first signal according to the at least one signal characteristic of the first signal, so as to obtain a recovered signal identical or similar to the first signal; and process the recovered signal together with the second signal, for example, process them through a phase-locked loop technology such as Costas loop, so as to obtain the phase change information.

Certainly, in an example embodiment, the apparatus 700 of the present application may directly acquire the first signal (in this implementation, it can be considered that all signal characteristics of the first signal are acquired) without recovering the signal, and the phase change information can be obtained by directly processing the first signal and the second signal.

Figure 8D:
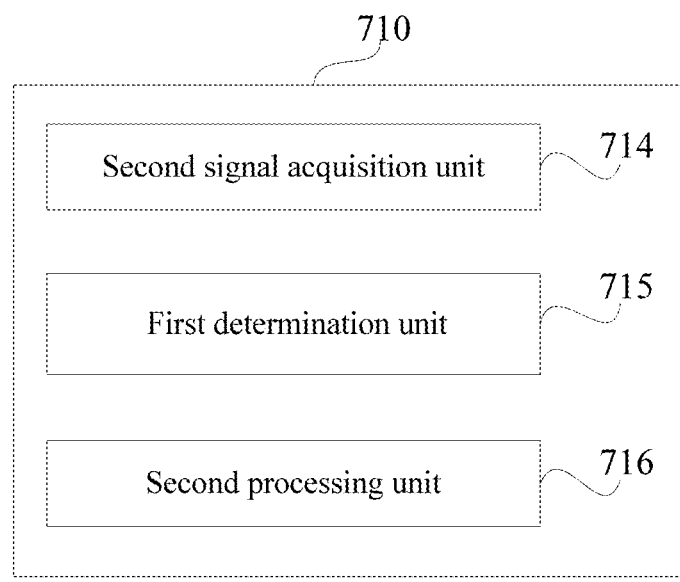

As shown in FIG. 8d, in another example embodiment, the first acquisition module 710 includes:

a second signal acquisition unit 714, configured to acquire the second signal within a set period of time;

a first determination unit 715, configured to determine at least one signal characteristic of the second signal corresponding to a first time within the set period of time and at least one signal characteristic of the second signal corresponding to a second time within the set period of time; and a second processing unit 716, configured to process the at least one signal characteristic of the second signal corresponding to the first time and the at least one signal characteristic of the second signal respectively corresponding to the second time, to obtain the phase change information.

In this implementation, the second signal acquisition unit 714 may have the same structure and function as those of the second signal acquisition unit 712 shown in FIG. 8b or FIG. 8c.

Different from obtaining phase change information of a second signal with respect to a first signal according to signal characteristics of the first signal and the second signal in a certain time, this implementation does not need to acquire the signal characteristics of the first signal, and in this implementation, the phase change information of the second signal in different time periods is acquired through before-and-after comparison of the second signal in a period of time. Reference can be made to corresponding description in the foregoing process embodiment for details, which is not repeated herein.

In an example embodiment of the embodiment of the present application, the first corresponding relationship, for example, may be:

a first relationship mapping table between the at least one phase change information and the at least one motion and/or posture information. By means of the first relationship mapping table, the motion and/or posture information corresponding to the phase change information can be found.

In another example embodiment of the embodiment of the present application, the first corresponding relationship, for example, may also be a first classifier, and by means of a classification algorithm corresponding to the first classifier, the motion and/or posture information corresponding to the phase change information can be acquired.

As shown in FIG. 8a, in the embodiment of the present application, the apparatus 700 further includes:

a first relationship acquisition module 750, configured to acquire the first corresponding relationship.

In an example embodiment, the first relationship acquisition module 750 includes:

a first machine learning unit 751, configured to acquire the first corresponding relationship through machine learning.

Reference can be made to corresponding description in the foregoing process embodiment for realization of acquisition of the first corresponding relationship by the first relationship acquisition module 750 in the embodiment of the present application.

In an example embodiment of the embodiment of the present application, for example, the motion and/or posture information determined may be provided to external software or hardware through a communication module, so as to implement functions corresponding to the motion and/or posture of the user.

In another example embodiment, the apparatus 700 further includes:

a first instruction determination module 760, configured to: according to a second corresponding relationship between at least one motion and/or posture information and at least one first instruction, determine a first instruction corresponding to the motion and/or posture information.

In the embodiment of the present application, the second corresponding relationship, for example, may be a second relationship mapping table between the at least one motion and/or posture information and the at least one first instruction.

In an example embodiment, the second corresponding relationship may be acquired by a user setting unit through user setting. In another example embodiment, the second corresponding relationship may also be acquired by a machine learning unit through machine learning according to previous habits of the user.

Herein, the first instruction, for example, may be an operation instruction for a user equipment.

In addition to determining motion and/or posture information of the user through phase changes of a signal described above, the inventor of the present application has further found upon research that, when the user executes an on-body touch input instruction, the resistance characteristics will change significantly due to construction of a new human body channel, which directly affects amplitude information of a received signal, and in this case, the capacitance characteristics are almost unchanged. In this way, by detecting and learning amplitude information of a signal, the on-body touch input instruction of the user can be detected separately. Therefore, as shown in FIG. 8*a*, in the embodiment of the present application, the apparatus 700 further includes:

a second acquisition module 770, configured to acquire amplitude change information of the second signal; and a second determination module 780, configured to: according to a third corresponding relationship between at least one amplitude change information and at least one touch action information of an on-body touch of the user, determine touch action information of the user corresponding to the amplitude change information.

In the embodiment of the present application, similar to acquisition of the first corresponding information described above, the third corresponding relationship may be in a form of a third relationship mapping table, or may be in a form of a second classifier. In the embodiment of the present application, the third corresponding relationship may also be acquired through machine learning.

Therefore, in the embodiment of the present application, the apparatus 700 further includes:

a third relationship acquisition module 790, configured to acquire the third corresponding relationship.

In an example embodiment, the third relationship acquisition module 790 includes:

a second machine learning unit 791, configured to acquire the third corresponding relationship through machine learning.

In this implementation, when the on-body touch of the user is performed to input an instruction, for example, when the right hand clicks on, slides on, or grips the left forearm, amplitude change information of the second signal is detected, and the corresponding posture and/or action is recognized through the pre-trained second classifier; reference can be made to corresponding description in the foregoing process embodiment for details.

Figure 8E:
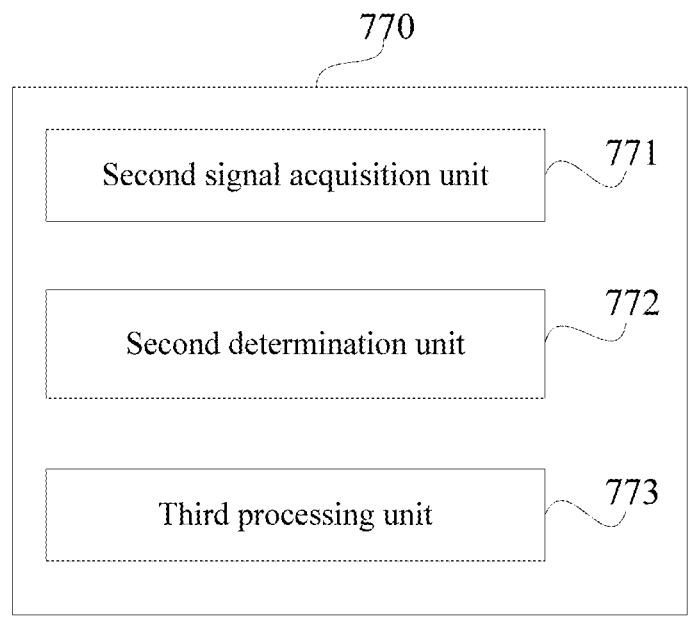
FIG. 8e is a schematic structural diagram of a second acquisition module of an interaction apparatus according to an embodiment of the present application.

As shown in FIG. 8*e*, in the embodiment of the present application, the second acquisition module 770 includes:

a second signal acquisition unit 771, configured to acquire the second signal within a set period of time;

a second determination unit 772, configured to determine amplitude information of the second signal corresponding to a first time and amplitude information of the second signal corresponding to a second time within the set period of time; and a third processing unit 773, configured to compare the amplitude information of the second signal corresponding to the first time and the amplitude information of the second signal corresponding to the second time, so as to obtain the amplitude change information.

In the embodiment of the present application, the first acquisition module 710 and the second acquisition module 770 can acquire the phase change information and the amplitude change information simultaneously through the second signal within the set period of time.

In one example embodiment of the embodiment of the present application, the apparatus 700 further includes:

a second instruction determination module 7100, configured to: according to a fourth corresponding relationship between at least one touch action information and at least one second instruction, determine a second instruction corresponding to the touch action information.

Certainly, in another example embodiment, the apparatus 700 may not include the second instruction determination module 7100, but provides the second instruction externally through a communication module.

In this implementation, as the body motion posture and on-body touch input instruction of the user are detected simultaneously on two dimensions of a signal, that is, amplitude and phase, touch input can be recognized more accurately, and two input manners may also be combined to provide the user with more flexible applications.

An application scenario of the apparatus 700 of the embodiment of the present application is described below in combination with the human body transmission channel shown in FIG. 1*a* and FIG. 1*b*.

In the embodiment of the present application, the apparatus 700 includes:

a transmitting module TX, configured to transmit the first signal through a TX electrode worn on the right hand of the user;

a receiving module RX, configured to collect the second signal through an RX electrode worn on the left hand of the user; and a processing module (not shown in FIG. 1*a* and FIG. 1*b*), configured to acquire phase change information of the second signal and determine motion and/or posture information of the user corresponding to the phase change information.

It can be seen from FIG. 1*a* and FIG. 1*b* that, a body node formed by the body of the user forms the human body transmission channel together with the ambient air. When the first signal sent by the TX electrode of the transmitting module TX is transmitted and affected through the human body transmission channel, the first signal is collected by the receiving module RX through the RX electrode.

When the body of the user is in different motions, postures and different on-body touch statuses, characteristics of the human body transmission channel change, so as to cause the second signal to change. Motions, postures and on-body touch statuses of the user corresponding to changes of the second signal can be determined according to the trained classifier, so as to provide a basis for body input of the user.

Figure 9:
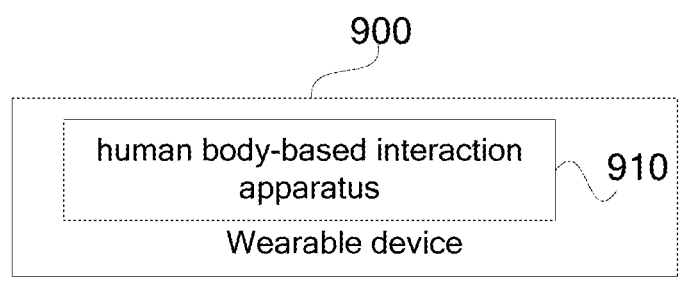
FIG. 9 is a schematic structural diagram of a wearable device according to an embodiment of the present application.

As shown in FIG. 9, an embodiment of the present application provides a wearable device 900, including the human body-based interaction apparatus 910 described above.

In the embodiments of the present application, the wearable device 900, for example, may be a smart bracelet, a smart ring, a smart insole and other smart wearable devices. In an example embodiment, the wearable device 900, for example, may further include two smart wearable devices, for example, a smart ring worn on the left hand of the user, configured to transmit the first signal; and a smart bracelet worn on the right hand of the user, configured to receive the second signal, and process the second signal to obtain a corresponding instruction.

Figure 10:
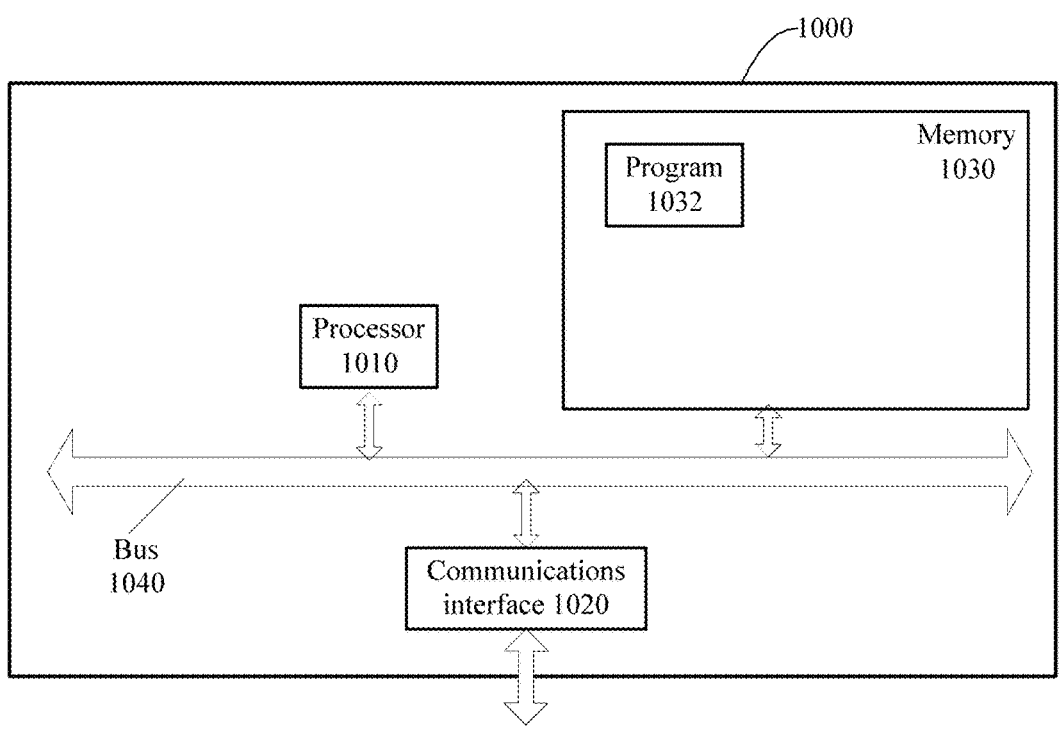
FIG. 10 is a schematic structural diagram of still another interaction apparatus according to an embodiment of the present application.

FIG. 10 is a schematic structural diagram of still another human body-based interaction apparatus 1000 according to an embodiment of the present application; the specific embodiment of the present application does not limit specific realization of the human body-based interaction apparatus 1000. As shown in FIG. 10, the human body-based interaction apparatus 1000 may include:

a processor 1010, a communications interface 1020, a memory 1030, and a communications bus 1040.

The processor 1010, the communications interface 1020, and the memory 1030 complete mutual communications via the communications bus 1040.

The communications interface 1020 is configured to communicate with a network element such as a client.

The processor 1010 is configured to execute a program 1032, and can specifically implement relevant steps in the process embodiments.

Specifically, the program 1032 may include a program code, the program code including a computer operation instruction.

The processor 1010 may be a central processing unit (CPU), or an application specific integrated circuit (ASIC), or be configured to be one or more integrated circuits which implement the embodiments of the present application.

The memory 1030 is configured to store the program 1032. The memory 1030 may include a high-speed RAM memory, and may also include a non-volatile memory, for example, at least one magnetic disk memory. The program 1032 may be specifically configured to enable the human body-based interaction apparatus 1000 to perform the following steps:

acquiring phase change information of a second signal; the second signal being formed by a first signal through transmission of at least one transmission medium, the at least one transmission medium including the body of a user; and according to a first corresponding relationship between at least one phase change information and at least one motion and/or posture information of the user, determining motion and/or posture information of the user corresponding to the phase change information.

Reference can be made to the corresponding descriptions in the corresponding steps and units in the foregoing embodiments for specific realization of each step in the program 1032, which is not repeated herein. Those skilled in the art can clearly understand that, reference can be made to the corresponding descriptions in the foregoing process embodiments for the particular working procedures of the devices and modules described above, and will not be repeated herein for sake of convenient and concise description.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The above embodiments are merely used to describe the present application, instead of limiting the present application; various modifications and variations can be made by those of ordinary skill in the art without departing from the spirit and scope of the present application; therefore, all equivalent technical solutions also fall into the scope of the present application, and the scope of patent protection of the present application should be defined by claims.

What is claimed is:

1. A method, comprising:
    acquiring, by a device comprising a processor, phase change information of a second signal, the second signal being formed by a first signal through transmission of at least one transmission medium, and the at least one transmission medium comprising a body of a user; and
    determining, according to a first corresponding relationship between the phase change information and at least one motion or posture information of the user, the at least one of motion or posture information of the user corresponding to the phase change information,
    wherein the first signal is generated in a first position of the body of the user, and reaches a second position other than the first position from the first position through the body of the user and an environmental medium in a vicinity of the body of the user, so as to form the second signal.

2. The method of claim 1, wherein the first signal is generated on the body of the user.

3. The method of claim 2, further comprising:
    transmitting the first signal in the first position of the body of the user.

4. The method of claim 1, wherein the acquiring the phase change information comprises:
    acquiring the second signal and at least one signal characteristic of the first signal; and processing the at least one signal characteristic and the second signal to obtain the phase change information.

5. The method of claim 4, wherein the acquiring the second signal comprises:
collecting the second signal.

6. The method of claim 5, wherein the collecting the second signal comprises:
collecting the second signal in a second position of the body of the user.

7. The method of claim 4, wherein the acquiring the second signal comprises:
receiving the second signal from at least one external device.

8. The method of claim 1, wherein the acquiring the phase change information comprises:
acquiring the second signal within a set period of time;
determining at least one first signal characteristic of the second signal corresponding to a first time within the set period of time and at least one second signal characteristic of the second signal corresponding to a second time within the set period of time; and
processing the at least one first signal characteristic of the second signal corresponding to the first time and the at least one second signal characteristic of the second signal corresponding to the second time to obtain the phase change information.

9. The method of claim 4, wherein the at least one signal characteristic comprises:
a timing code, a fingerprint of frequency, a frequency spectrum, an amplitude, a phase, an average value of frequency, a frequency spectrum, or a differential value of frequency.

10. The method of claim 1, further comprising:
acquiring the first corresponding relationship.

11. The method of claim 10, wherein the acquiring the first corresponding relationship comprises:
acquiring the first corresponding relationship through machine learning.

12. The method of claim 1, further comprising:
determining, according to a second corresponding relationship between at least one of motion or posture information and at least one first instruction, the at least one first instruction corresponding to the at least one of motion or posture information.

13. The method of claim 1, further comprising:
acquiring amplitude change information of the second signal; and
determining, according to a third corresponding relationship between the amplitude change information and at least one touch action information of an on-body touch of the user, the at least one touch action information of the user corresponding to the amplitude change information.

14. The method of claim 13, further comprising:
acquiring the third corresponding relationship.

15. The method of claim 14, wherein the acquiring the third corresponding relationship comprises:
acquiring the third corresponding relationship through machine learning.

16. The method of claim 13, wherein the acquiring the amplitude change information comprises:
acquiring the second signal within a set period of time;
determining first amplitude information of the second signal corresponding to a first time and within the set period of time and second amplitude information of the second signal corresponding to a second time within the set period of time; and
comparing the first amplitude information of the second signal corresponding to the first time and the second amplitude information of the second signal corresponding to the second time to obtain the amplitude change information.

17. The method of claim 13, further comprising:
determining, according to a fourth corresponding relationship between the at least one touch action information and at least one second instruction, the at least one second instruction corresponding to the at least one touch action information.

18. An apparatus, comprising:
a processor, coupled to a memory, that executes or facilitates execution of executable modules, comprising:
a first acquisition module configured to acquire phase change information of a second signal, the second signal being formed by a first signal through transmission of a transmission medium, and the transmission medium comprising a body of a user; and
a first determination module configured to determine, according to a first corresponding relationship between phase change information and motion or posture information of the user, the motion or posture information of the user corresponding to the phase change information,
wherein the first signal is generated in a first position of the body of the user, and reaches a second position other than the first position from the first position through the body of the user and an environmental medium in a vicinity of the body of the user, so as to form the second signal.

19. The apparatus of claim 18, wherein the first signal is generated on the body of the user.

20. The apparatus of claim 19, wherein the executable modules further comprise:
a transmitting module configured to transmit the first signal in the first position of the body of the user.

21. The apparatus of claim 18, wherein the first acquisition module comprises:
a first signal acquisition unit configured to acquire a signal characteristic of the first signal;
a second signal acquisition unit configured to acquire the second signal; and
a first processing unit configured to process the signal characteristic and the second signal to obtain the phase change information.

22. The apparatus of claim 21, wherein the second signal acquisition unit comprises:
a collection sub-unit configured to collect the second signal.

23. The apparatus of claim 22, wherein the collection sub-unit is further configured to collect the second signal in a second position of the body of the user.

24. The apparatus of claim 21, wherein the second signal acquisition unit comprises:
a communication sub-unit configured to receive the second signal from at least one external device.

25. The apparatus of claim 18, wherein the first acquisition module comprises:
a second signal acquisition unit configured to acquire the second signal within a set period of time;
a first determination unit configured to determine a first signal characteristic of the second signal corresponding to a first time within the set period of time and a second signal characteristic of the second signal corresponding to a second time within the set period of time; and a second processing unit configured to process the first signal characteristic of the second signal corresponding to the first time and the second signal characteristic of the second signal corresponding to the second time to obtain the phase change information.

26. The apparatus of claim 21, wherein the signal characteristic comprises:
a timing code, a fingerprint of frequency, a frequency spectrum, an amplitude, a phase, an average value of frequency, or a differential value of frequency.

27. The apparatus of claim 18, wherein the executable modules further comprise:
a first relationship acquisition module configured to acquire the first corresponding relationship.

28. The apparatus of claim 27, wherein the first relationship acquisition module comprises:
a first machine learning unit configured to acquire the first corresponding relationship through machine learning.

29. The apparatus of claim 18, wherein the executable modules further comprise:
a first instruction determination module configured to determine, according to a second corresponding relationship between motion or posture information and a first instruction, the first instruction corresponding to the motion or posture information.

30. The apparatus of claim 18, wherein the executable modules further comprise:
a second acquisition module configured to acquire amplitude change information of the second signal; and
a second determination module configured to determine, according to a third corresponding relationship between the amplitude change information and touch action information of an on-body touch of the user, the touch action information of the user corresponding to the amplitude change information.

31. The apparatus of claim 30, wherein the apparatus executable modules comprises:
a third relationship acquisition module, configured to acquire the third corresponding relationship.

32. The apparatus of claim 31, wherein the third relationship acquisition module comprises:
a second machine learning unit configured to acquire the third corresponding relationship through machine learning.

33. The apparatus of claim 30, wherein the second acquisition module comprises:
a second signal acquisition unit configured to acquire the second signal within a set period of time;
a second determination unit configured to determine first amplitude information of the second signal corresponding to a first time and within the set period of time and second amplitude information of the second signal corresponding to a second time within the set period of time; and
a third processing unit configured to compare the first amplitude information of the second signal corresponding to the first time and the second amplitude information of the second signal corresponding to the second time to obtain the amplitude change information.

34. The apparatus of claim 30, wherein the executable modules further comprise:
a second instruction determination module configured to determine, according to a fourth corresponding relationship between touch action information and a second instruction, the second instruction corresponding to the touch action information.

35. A wearable device, comprising the apparatus of claim 18.

36. A non-transitory computer readable storage device comprising executable instructions that, in response to execution, cause a device comprising a processor to perform operations, comprising:
acquiring phase change information of a second signal, wherein the second signal is formed by a first signal through transmission of at least one transmission medium, and wherein the at least one transmission medium comprises a body of a user; and
determining, according to a first corresponding relationship between phase change information and motion or posture information of the user, the motion or posture information of the user corresponding to the phase change information,
wherein the first signal is generated in a first position of the body of the user, and reaches a second position other than the first position from the first position through the body of the user and an environmental medium in a vicinity of the body of the user, so as to form the second signal.

* * * * *